UNITED STATES PATENT OFFICE.

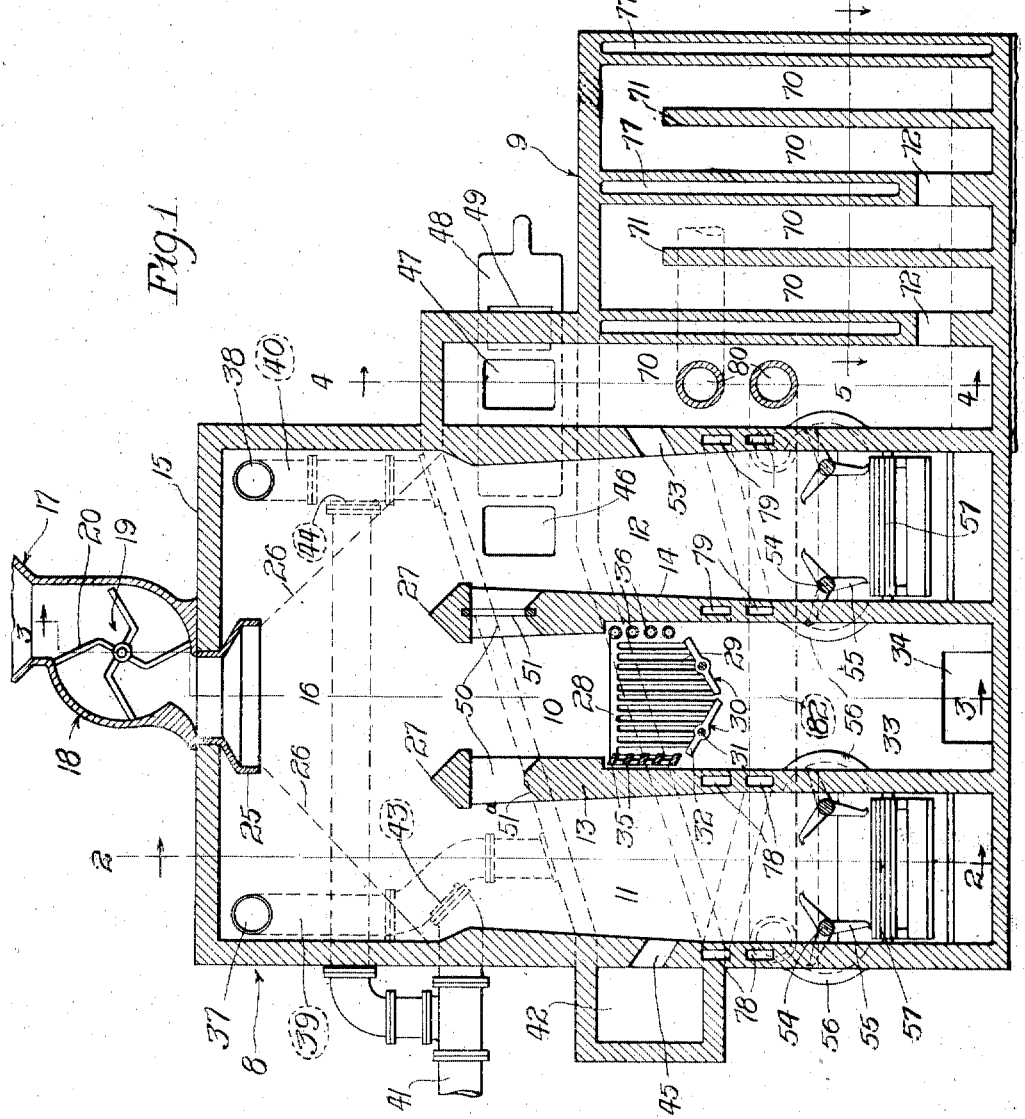

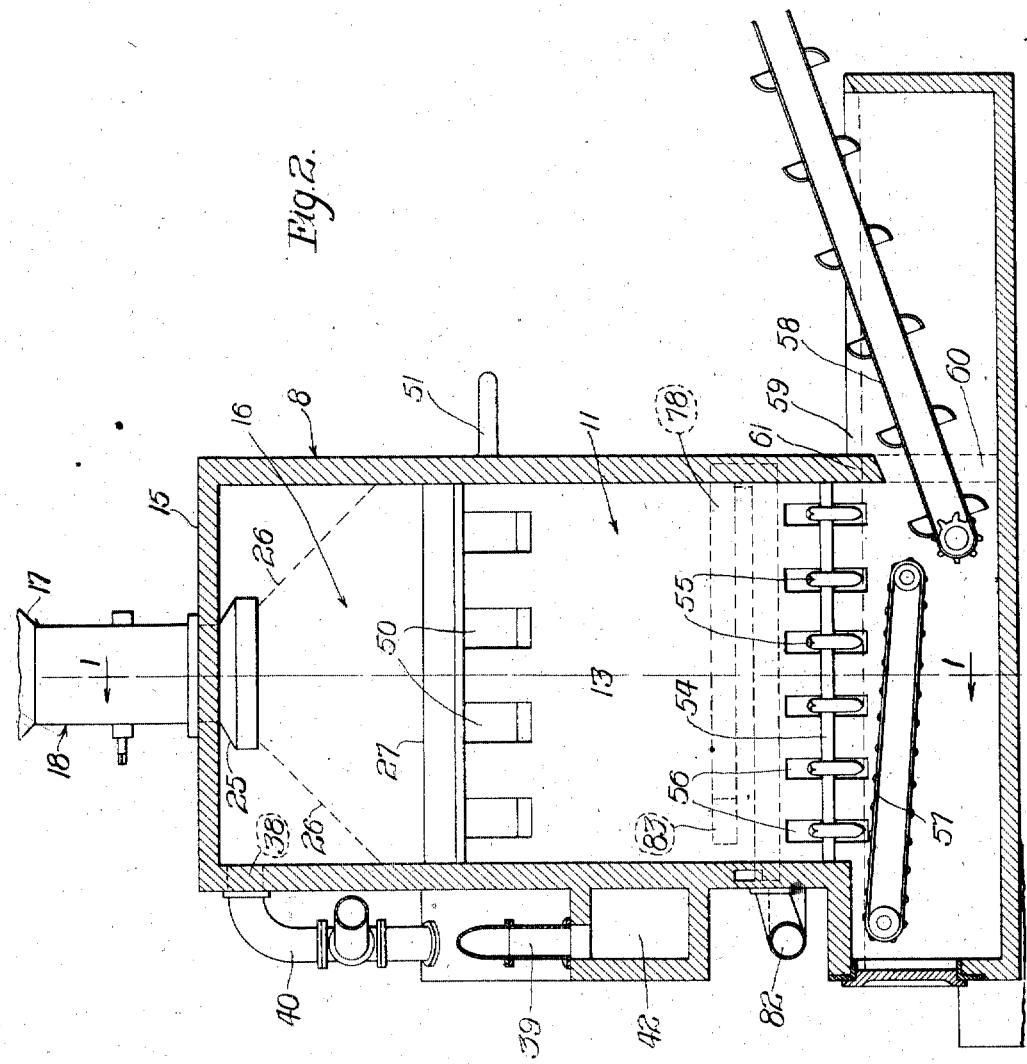

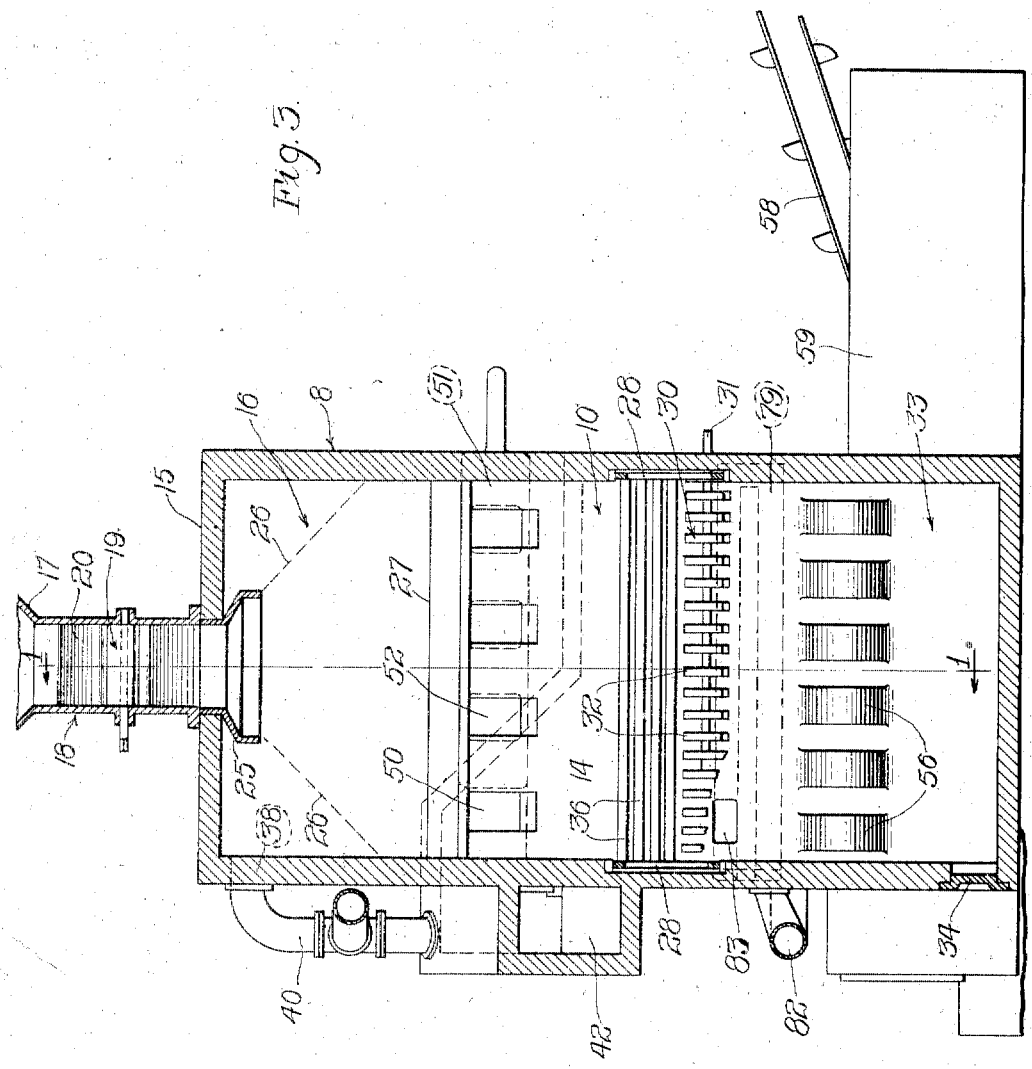

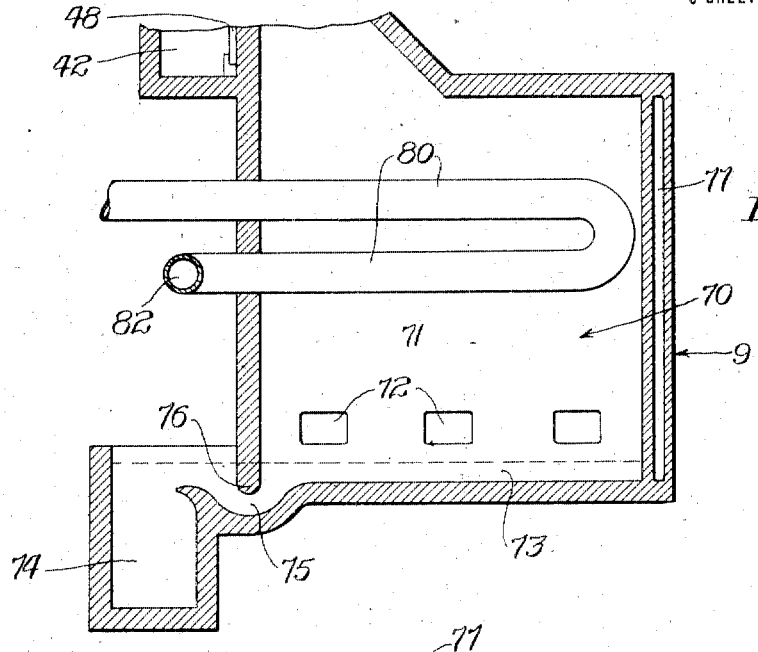
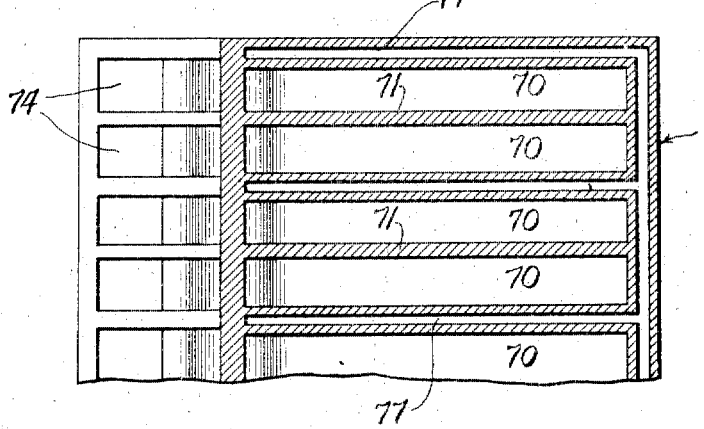

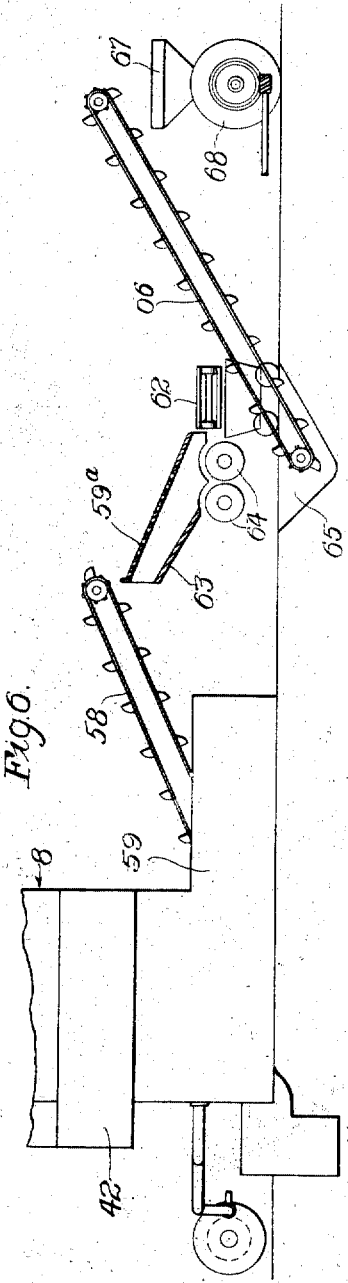

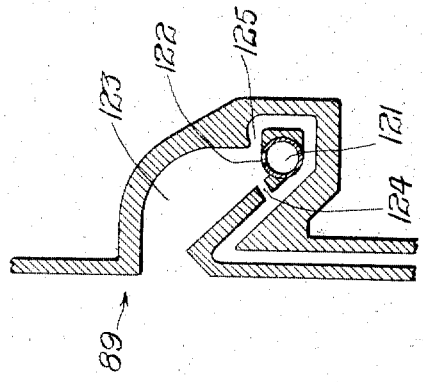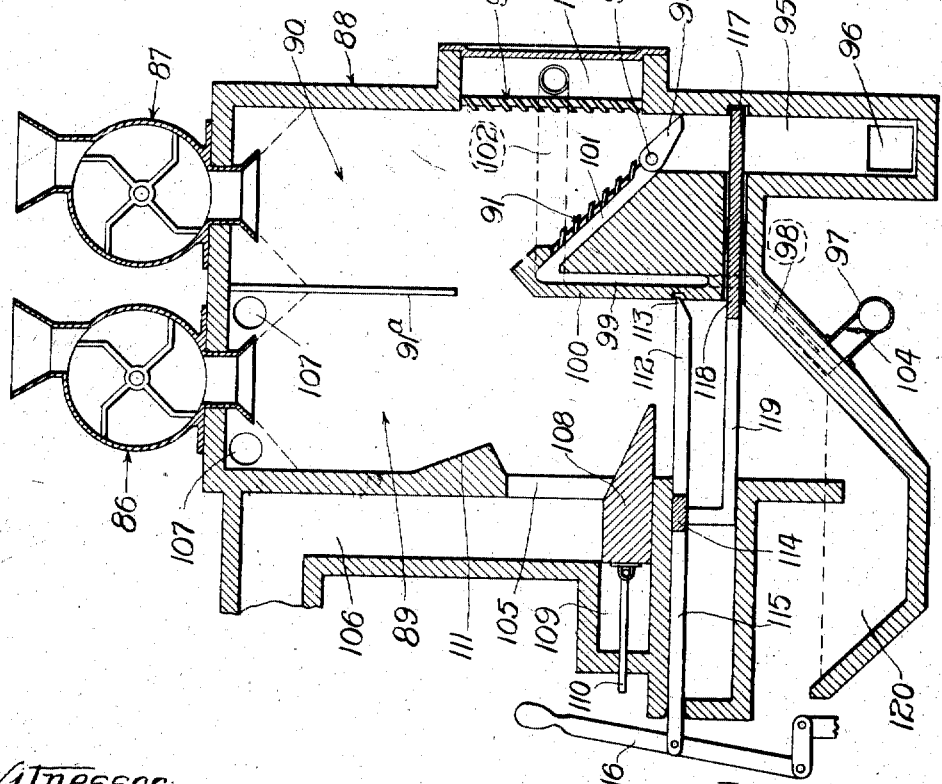

FRANCIS PRIBYL, OF WILMETTE, ILLINOIS.

COKING APPARATUS.

1,279,757.  Specification of Letters Patent.  Patented Sept. 24, 1918.

Application filed November 4, 1913, Serial No. 799,113. Renewed December 17, 1917. Serial No. 207,628.

*To all whom it may concern:*

Be it known that I, FRANCIS PRIBYL, a citizen of the United States, residing at Wilmette, in the county of Cook and State of Illinois, have invented certain new and useful Improvements in Coking Apparatus, of which the following is a specification.

One of the main objects of the present invention is to provide a process and a construction whereby the coal or other material may be fed in continuously or periodically at the desired rate, the distillation proceeding at a substantially constant rate, so that the gases given off will remain constant in quality and characteristics, thereby obviating the necessity of providing any other means for securing a uniformity of the gas. Another object in this connection is to provide a construction such that if desired the richer gases, composed chiefly of the saturated and unsaturated hydrocarbons, may be taken off separate from the leaner gases which comprise chiefly the leaner hydrocarbons and the hydrogen, so that by means of such separation, gases adapted for different purposes and uses can be simultaneously obtained. Means are, however, provided for mixing these gases at certain stages in the distillation process, so that if desired, there can be obtained a composite gas having the properties and characteristics of a mixture or composition of all, or a portion, of the constituent gases.

Another object of the invention is to enable the simultaneous production of the leaner hydrocarbons and hydrogen, or the producer gas or water gas, so that if desired, a gas having the characteristics of a mixture of the leaner hydrocarbons and producer gas or water gas can be obtained.

Still another object is to provide a construction such that the distillation can be carried forward at any desired speed with a corresponding control of the quality and characteristics of the coke or partially coked material, according to the subsequent heat to which such material is to be placed. For example, in case it is desired to fully remove the volatile contents, the speed and manner of operation may be adjusted accordingly, but in case it is desired to produce a product from which the volatile contents have been only partially removed or distilled, the speed of operation can be accordingly adjusted. Such a material might be of value in the manufacture of a new and improved form of briquet, which might be called a smokeless briquet and which would be made from a material having only a portion of the volatile contents removed.

As the richer hydrocarbons pass off they contain a comparatively large per cent. of materials which, under varying conditions, condense into tars or other liquid products. The temperatures and conditions under which such condensation takes place are generally such that these materials are deposited very shortly after the richer hydrocarbons have left the material which is being distilled, and they are frequently a source of annoyance and trouble for the reason that they tend to clog the pipes or conduits through which the gas is being conducted. However, in case the gases be subjected to certain additional heat or other treatment, it will be found that the gases which would otherwise have condensed to form these tarry materials will be "fixed" or "cracked" in such manner that the tarry materials cannot form. By treating the gas in this manner the aforementioned objection to the use of the richer hydrocarbons is overcome, and at the same time the tar producing materials are brought into a condition where they will be of value in the gas production. For this purpose I have provided a construction such that the richer hydrocarbons can be passed directly to a distributing main, or can be passed into another heated body for further treatment if desired.

In the manufacture of producer gas and water gas according to present processes of which I am aware, the heat necessary for carrying on the process is generated by the consumption of a portion of the material which is undergoing distillation, so that the coal or other material which is being "coked" is subsequently consumed or burned for the generation of additional heat. It therefore follows that when the coking action is carried on with such a process there is no separation of the coking material from the material which is being consumed for the generation of the heat, and therefore the coking material cannot be subsequently recovered as a by-product or otherwise. Furthermore, it generally happens that the amount of heat generated by the combustion of the coal in this manner is much greater than that necessary for carrying on the distillation process. This results in a considerable waste of heat energy and consequently a useless consumption of material.

One of the fundamental features underlying the operation of the mechanism to which the present invention relates is the passage of the hot gases as soon as generated and without free oxygen through a body of carbonaceous material other than that which is consumed in the production of the hot gases, so that the entire body of carbonaceous material undergoing distillation will be treated to the distilling action, without any oxidation, and thus leaving the entire solid contents of the carbonaceous material as "coke" of the desired composition and characteristics for recovery as a by-product, or, in some cases, as the main product of distillation. As one means of carrying into effect the process I pass hot carbon monoxid and nitrogen or hot water gas or producer gas, generated in the manner described through the body of carbonaceous material which is undergoing treatment. As a simple means of carrying into effect this feature of the invention I have provided one chamber or portion of receptacle in which a portion of material is undergoing oxidation to carbon monoxid, or to water gas, or producer gas, and then pass such gas through a body of carbonaceous material contained in another receptacle or another portion of the same receptacle.

In addition to the foregoing objects general objects may be stated to be the provision of an arrangement such that the coking can be carried forward with a maximum efficiency and economy and in such manner as to produce resultant products of varying forms and conditions according to the wishes of the operator. Other objects and uses will appear from a detailed description of the invention, which consists in the processes, and constructions of apparatus hereinafter described and claimed.

In the drawings:

Figure 1 shows a vertical section through one form of construction or mechanism whereby various features of the invention herein disclosed may be put into effect. Fig. 1 may be considered as a section taken on lines 1—1 of either Fig. 2 or Fig. 3;

Fig. 2 is a cross section taken on line 2—2 of Fig. 1 looking in the direction of the arrows;

Fig. 3 is a cross section taken on line 3—3 of Fig. 1 looking in the direction of the arrows;

Fig. 4 is a cross section taken on the line 4—4 of Fig. 1 looking in the direction of the arrows;

Fig. 5 is a horizontal section through the gas purifier, being taken on the line 5—5 of Fig. 1 looking in the direction of the arrows;

Fig. 6 shows diagramatically a plant for the manufacture of briquets and the like according to the process of my invention;

Fig. 7 is a plan view of the arrangement shown in Fig. 6;

Fig. 8 shows a vertical section through a modified construction of mechanism embodying the features of invention included in the previously illustrated construction; and Fig. 9 shows a modification of the heat generating element of the arrangement shown in Fig. 8.

In the particular arrangement illustrated in Fig. 1-7 inclusive I have provided a common receptacle from which the coal, peat, wood, lignite, or other material may be fed into the several chambers or compartments wherein the distilling processes are carried forward, while in the arrangement shown in Figs. 8 and 9 separate receptacles for the carbonaceous material and for the heat generating material are provided. In the particular arrangement illustrated in Figs. 1 to 7 inclusive, I have shown the gas generating and coking generator as associated with a series of gas purifiers or tar separators. It will, however, appear that this arrangement may also be modified or changed according to requirements.

In Figs. 1 to 7 inclusive, the gas generating and coking compartment is designated in its entirety by the numeral 8, while the gas purifying compartment is designated in its entirety by the numeral 9. The generating compartment includes the producer gas compartment 10 and the coking compartments 11 and 12, indicated respectively at the left and right hand sides of the producer gas compartment in Fig. 1. As a convenient mode or manner of construction, all three of these compartments are embodied or contained within a common inclosure, being separated from each other simply by the partitions 13 and 14. These partitions are shown as terminating some distance below the roof 15 so as to provide a space 16 above all three compartments and beneath a feed hopper or the like 17. This hopper may be of any suitable construction whereby the coal or other material may be fed into the space 16. In the arrangement illustrated a body portion 18 communicates at its upper end with the hopper 17, and at its lower end with the space 16. Within this body portion is rotatably mounted a member 19 having a plurality of blades 20. These blades work within the body portion and allow quantities of the coal or other material to pass from the hopper into the space 16, but prevent a back flow of gas from the space 16. As fast as the material within the generator is consumed the coal finds its way down into the several compartments 10, 11, and 12, drawing away from the feeding mechanism, and allowing the weight of the coal contained in the hopper to rotate the member 19 and thus deliver additional coal to the space 16. A guide flange 25 preferably extends straight down into the space 16 to allow the coal to be properly delivered to the several compartments. Under these circumstances the coal or other material will fill all three of the compartments 10, 11 and 12 substantially up to the broken lines 26 of Fig. 1, thoroughly covering over the upper edges of the partitions 13 and 14. In order to better direct the coal during this filling operation it is preferred that the upper edges 27 of the partition be tapered or wedge-shaped, as indicated in Fig. 1.

In the lower portion of the compartment 10 there is mounted a grate structure for supporting the material contained in such compartment. In the arrangement illustrated this structure takes the form of a cradle having the end walls 28 provided with vertical bars 29 the ash grate 30 sustaining the material contained in the compartment. These ash grates may be of any desired construction, and are illustrated as taking the form of longitudinally extending rocker rods 31 carrying the grate bars 32. The arrangement is such that the ash will pass into an ash pit 33 as it is formed, or so that the entire body of material contained in the producer gas compartment can be dropped into said pit, if desired. A door 34 provides a ready means for cleaning the pit from time to time as desired. Along one side of the cradle there may be provided a number of separated bars 35 which are set inward a slight distance from the partition 13 to permit air to freely gain access to the side of the body of material contained in the compartment 10. A number of water heating coils or pipes 36 may be extended along the other side of the cradle for the purpose of absorbing some of the heat generated therein, as for example for the generation of steam.

The upper portion of the structure is provided with discharge ports 37 and 38 through which the richer gases may be delivered by means of downcomers 39 and 40 either to a manifold 41 or to a flue 42, depending upon the positions of the valves 43 and 44. In Fig. 1 these valves are shown as being thrown into position to deliver the gas into the flue 42. By throwing each of said valves over through an angle of 90 degrees they will cause the gases to be delivered to the manifold 41, whereas by throwing them to some intermediate position the gas will be split into two parts, one part going to the manifold and one part to the flue. These ports 37 and 38 are for the purpose of taking off the richer hydrocarbons when the plant is operated in a manner to be presently described.

The flue 42 is placed in communication with the lower portion of the compartment 11 by means of a port 45 in the side of such compartment. Thence this flue extends across the rear of the structure, as shown by the dotted lines in Fig. 1, and is adapted to deliver its gas either through the port 46 to the compartment 12 or through the port 47 to the gas purifying department 9. A valve 48 is adapted to control the delivery of gas through the ports 46 and 47, and for such purpose this valve takes the form of a plate having an opening 49. When the plate is drawn out into the position shown in Fig. 1 the port 46 is opened and the port 47 is closed whereas when the plate is forced inward the reverse action takes place. It will be seen, however, that this valve can be stopped at intermediate positions so as to permit delivery of the gas partly through each port.

The upper portions of the partitions 13 and 14 are provided with openings 50 which preferably have their lower edges beveled as at 51ª. It is preferred that each partition be provided with a plurality of such openings spaced across its upper portion, as best illustrated in Figs. 2 and 3. The openings in the partition 14 may be controlled by a valve member 51. In the arrangement illustrated this valve member takes the form of an elongated plate having a plurality of holes 52 corresponding to the holes 50. When the plate is drawn over into the position shown in Fig. 3 all of the openings will be uncovered whereas when the plate is forced over the proper distance, all of the openings will be closed. It will be seen, however, that this plate may be thrown into intermediate position where the openings will be only partly closed.

With the arrangement thus far described the operation may be carried on as follows: Assuming that the raw material is to be coal, the hopper 7 is filled from time to time so that a substantially continuous supply of coal will be delivered into the space 16 in the upper portion of the structure. This coal will feed down simultaneously into the compartments 10, 11 and 12 as needed, and will maintain an angle of repose substantially on the lines 26 as shown in Fig. 1. The heat required for carrying on the distillation and cooking process is to be generated in the compartment 10, while the distillation and cooking processes are to be carried on mainly on the compartments 11 and 12. Some of the distillation will take place in the space 16. To this end air, or if desired, a mixture of air and steam, is delivered into the ash pit 33 from which it will pass upwardly through the body of burning and incandescent coal contained in compartment 10. The coal in this body will burn for the production of heat, and by properly regulating the air supply, or the supply of air and steam, producer gas, or a mixture of producer and water gas will be delivered from this compartment. In order to properly carry on this producer gas manufacture the compartment 10 should be of sufficient size to provide a large enough body of incandescent material to consume the oxygen as it is admitted without the generation of carbon dioxid, or if generated to reconvert it to monoxid.

The heat generated by the process going on in the compartment 10 will be radiated and conducted, or carried by convection through the partitions 13 and 14 and as sensible heat in the gases passing from the compartment 10 through the compartments 11 and 12 into the coal of the adjacent compartments 11 and 12, and will also serve to heat the body of coal above the upper edges 27 of the partitions. As the coal enters from the hopper it is substantially cold, but as it passes downward it becomes hotter and hotter, and correspondingly distils. As previously explained the first gases given off are the richer hydrocarbons, and inasmuch as the coal from which these gases are distilling is the coal in the upper part of the space 16, and is therefore that coal closest to the ports 37 and 38, it follows that if a slight suction, or at least if a free exit be allowed at these ports, the richer hydrocarbons will pass out through them as rapidly as generated. Thence such gas will pass either to the manifold 41 or to the flue 42 as previously explained.

There is maintained in the purifying department a suction sufficient to insure that the major portion of the gases generated in the compartment 10 will pass by way of the port 45 and flue 42, or by way of the port 53, into the purifying department, assuming that the valve 51 be thrown into open position, and that the valve 48 be thrown over so as to close the port 46 and open the port 47. If the valve 48 be thrown over to close the port 47 and open the port 46 the gas generated in the compartment 10 will pass by way of the port 45 and flue 42, through the port 46 into the compartment 11, and will there mingle with the gas generated in the compartment 11. Thence all of such gas will pass by way of the port 53 into the purifying department. On account of the sensible heat contained in the gases, and on account of the radiation or passage of heat from the compartment 10 through the partitions 13 and 14, the material contained in the compartments 11 and 12 will be raised to such a temperature as to continue the distillation process in such compartments. Therefore the gases passing to the purifying department will comprise not only the producer gas or water gas generated in the compartment 10, but also whatever of the leaner hydrocarbons are generated in the compartments 11 and 12.

In case the valves 43 and 44 be thrown into the position illustrated in Fig. 1 the richer hydrocarbons will also be delivered into the flue 42, and will thence be carried into the gas purifying department along with the gases coming from the compartments 11 and 12, so that under these conditions the gas handled in the purifying department will be a mixture of all of the gases generated including the richer hydrocarbons, producer gas, water gas (in case steam be admitted to the ash pit) and the leaner coal gases or hydrocarbons. In case the valve 48 be drawn over into the position illustrated in Fig. 1, leaving the valve 51 in the position illustrated in Fig. 3, and leaving the valves 43 and 44 in the position illustrated in Fig. 1 the producer gas will pass through both of the compartments 11 and 12 to mingle with the leaner hydrocarbons therein generated, and the richer hydrocarbons will be diverted down through the compartment 12 so that they will be acted upon by the mass of incandescent material contained in the compartment 12. Thence all of the gases will pass by way of the port 53 into the purifying department. Under these conditions the richer hydrocarbons will be subjected to the action of the mass of incandescent material in the compartment 12 so that those portions which would otherwise condense into the tar products will be "split" or "fixed" by this mass of incandescent material, to thereby prevent the formation of tars from them. In case the valve 51 be thrown over into position to close the ports of the partition 14, the valve 48 being left in the position indicated in Fig. 1, all of the gases generated into the compartment 10 will pass by way of the compartment 11, flue 42, and port 46 down through the compartment 12 to be there acted upon again by the mass of incandescent material contained in compartment 12. Under these conditions the action in the compartment 12 will be different from that in the compartment 11 so that the coke produced therein will be of different characteristics from that in the compartment 11. Of course the operation just outlined may be in turn modified by having the valves 43 and 44 either open or closed.

From the foregoing it will be seen that many different kinds or qualities of gas may be produced in the arrangement herein disclosed, and that many different processes for the treatment of coal, peat, wood, lignite, etc., may be carried on according to the desires of the operator. I will now proceed to consider more fully the disposition of the materials formed in the compartments 11 and 12. In the lower portion of each side of each compartment there is mounted a transversely extending shaft or rod 54 which carries a number of sets of picks or the like 55. These shafts are rotated over so that the picks approach each other in the upper portions of their circular travel. Any suitable mechanism may be adopted for rotating the shafts. It is preferred that the shafts be mounted close up to the side of the compartments substantially as indicated, and pockets or the like 56 may be provided for the accommodation of the picks in their rotation. The picks may be spaced a suitable distance apart as illustrated in Fig. 2, or as shown by the raised or projecting pockets in Fig. 3. The picks of each compartment are adapted to support and work against the lower portion of the mass of material contained therein, breaking off or removing the material from the lower portion of such mass, and thus allowing the mass to gradually work downward in the compartment. In order to facilitate this action, and to prevent binding of the mass against the side walls of the compartment, said side walls are preferably tapered away from each other as they proceed downwardly, as is clearly shown in Fig. 1. By adjusting the speed of rotation of the picks in each compartment the speed at which the material is removed from the lower portion of the mass may be adjusted, and thus the period of time necessary for the material to pass down through the compartment may be adjusted to give either a rapid or slow travel. If the travel is to be rapid the material will only be subjected to the action of the heat for a short time, with the result that only a portion of the hydrocarbons will be extracted from the coal or other material. On the other hand if a slow operation be used the coking process may be carried through to completion, practically all of the volatile matters being distilled off.

The picks of each compartment are adapted to deliver their material down onto a conveyer 57 of suitable form and construction. This conveyer is preferably set with its carrying surface at a different angle from the angle of the shafts 54, so that as the material accumulates on the conveyer in its travel, sufficient clearance will be provided to accommodate the increasing depth of material. In the arrangement illustrated the shafts 54 are horizontal while the conveyers are set to travel downward. Each of the conveyers 57 delivers its material to another conveyer 58 by which it will be carried up and delivered to a screen or the like 59ª. Inasmuch as the compartments 11 and 12 are constantly subjected to a certain amount of suction for the purpose of carrying off the gases generated in them it is necessary to provide some form of seal to prevent air from flowing up into the lower portions of the compartments. For this purpose a trough 70 or the like 59 is provided corresponding to each compartment, and each trough communicates by means of an opening 60 with the picks of the corresponding compartments. The front wall of each compartment is carried down low enough to provide an inverted weir 61, which extends down into the water of the trough. With this arrangement it follows that as the material is delivered from the picks it will have to pass down into the water of the trough, and be thence raised again by means of the conveyer 58. Thus the water serves the two functions of sealing the compartment against the entrance of air, and of cooling the material taken off by the picks, so that such material will not become ignited when it finally emerges into the air. This construction is well illustrated in Figs. 2 and 3. In case the speed of operation in the compartments 11 and 12 be comparatively rapid so that only a portion of the volatile contents is removed from the material in such compartments, it will be found that the material taken off by the picks can be brought into a softened condition by the application of a moderate degree of heat. Therefore this material is admirably adapted for use in the manufacture of a quality of briquet to be presently described, inasmuch as it is not necessary to add binding material to the material for working up into the briquet. But when the plastic coal is thus briqueted it is conveyed directly to briqueting machinery and only when briqueted is dropped into water to be cooled off.

When it is desired to use the material delivered by the picks in a briqueting process after it has been coked hard an arrangement such as that disclosed in Figs. 6 and 7 may be used. In such arrangement each of the conveyers 58 delivers its material to a screen 59ª which serves to catch the larger portions of material and run them down onto a conveyer 62, the finer material passing through the screen and running over a chute 63 to a pair of crushing rolls or the like 64. From these rolls the finely crushed materials pass into a pit 65 to be thence carried by a conveyer 66 to a hopper 67. Each hopper delivers its material to a mixer 68 where other binding materials are added. If the material delivered from the coking and gas generating plant be fully distilled it is necessary to add a binding material, such as tar or powdered caking coal which is done in the mixers 68. From the mixer 68 the material passes to the briqueting machines 69 where it is finally working into the desired form.

It will now be apparent that the herein disclosed arrangement is such that briquets of any desired composition may be produced, depending largely upon the speed at which the compartments 11 and 12 are operated, depending upon the manner in which the gas is handled through the flue, etc. It will also be seen that it is possible with this arrangement to produce a smokeless briquet, that is one made from a coal, peat, or other material from which a portion or all of the volatile matter has been expelled. By expelling only a portion of the volatile matter, namely, the richer hydrocarbons, the material taken off by the picks will be of such composition that the briquets can be formed up merely by the application of heat, and without the necessity of adding any other binding material. Furthermore the briquets as made in this manner will be sufficiently free from volatile matter to burn smokeless, thus making them extremely desirable for use in many localities. Nevertheless, when the briquets are made in this way all of the volatile matter which was driven off has been saved and can be used in the gas manufacture.

The gas purifying compartment 9 includes a plurality of cells or compartments 70 through which the gas may be directed in succession for the extraction of the tarry matter. These cells are in pairs, a partition 71 extending upward to separate the lower portions of each pair of cells. Openings 72 connect adjacent pairs of cells together so that the gas will have an up and down movement as it passes through the series of cells. The lower portions of the cells constitute pans or troughs 73 in which the tarry matters may be collected below the openings 72. At the rear side of the structure there is a vat 74 corresponding to each of the cells 70 and each of the pockets 73 is in communication with the corresponding vat by means of a passage 75 beneath an inverted weir 76. With this arrangement it follows that the tarry matter deposited in each cell will collect in the lower portion thereof and may pass thence beneath the weir to the corresponding vat where it will collect and from which it may be removed from time to time. Owing to the fact that there is a vat 74 corresponding to each cell it follows that the various tars deposited in the cells may be collected separately. This enables the tars of various compositions and qualities to be separately collected. I have provided means for cooling the walls of the cells if that should be desired, so as to assist the condensation of the tar. For this purpose the walls are made hollow to provide the openings 77, best shown in Figs. 1, 4 and 5, and any suitable means may be provided for causing streams of water to circulate in such openings to keep the walls wet for cooling purposes. When it is desired to use tar as a binder in the briqueting machines such tar may be obtained from the desired cell, or may be brought in from some other source, if desired.

It is desired to cool the material passing downward through the compartments 11 and 12 after it has passed the openings 45 and 53, to improve the action of the picks or other disintegrating mechanism, and to improve the quality of the material delivered by the picks. At the same time it is desired to conserve as much as possible the sensible heat given off by this material as it cools so as to improve the efficiency of operation of the system as a whole. For this purpose I have provided means for circulating air in those portions of the walls of the compartments which lie at points below the grate 30 and below the openings 45 and 53, inasmuch as it is not necessary, and may not be desirable for the distillation process to continue after the materials have passed below the openings 45 and 53. These are the air passages 78 of the compartment 11, and 79 of the compartment 12. In order to still further improve the efficiency of operation it is desired to remove as much as possible the heat contained in the gases when they first enter the purifying department. For this purpose the flues 80 extend back and forth in the compartment 70 into which the gases are first delivered, and where they are hottest. A blower or the like 81 delivers air into the flue 80 through which it traverses the compartment 70 back and forth and is then delivered to a manifold 82. From this manifold the heated air is delivered approximately one-half into the lower right hand passage 79 of the compartment 12, and approximately one-half into the lower left hand passage 78 of the compartment 11. The air of each passage then passes forward, up, and back, and then across. The air being heated by the compartment 12 passes across to the lower left hand passage 79, while that being heated by the compartment 11 passes across to the lower right hand passage 78. In these passages the air passes forward, then up, and then back, and is finally delivered through the ports 83 into the ash pit beneath the producer gas compartment 10. It thus follows that the air being delivered for combustion purposes is heated by the cooling materials so that a very large percentage of the heat which would otherwise be wasted is conserved and thus the efficiency of operation is improved.

As a means for operating the blower a steam engine or turbine 84 may be used, the same delivering its exhaust steam to the atmosphere or by means of a connection 85 into the air flue. This latter connection is provided for use in case it should be desired to introduce steam into the producer gas compartment 10 for the manufacture of water gas in the manner previously set forth. When operating in this manner the steam will be carried into the incandescent mass in the compartment 10 along with the air for combustion.

In Figs. 8 and 9 I have shown a modified construction in which the compartment or receptacle for the carbonaceous material undergoing treatment is a portion of that compartment in which the hot gases are being produced, but in which construction the carbonaceous material used for the generation of the hot gases may be different in quality and characteristics from that which is undergoing treatment. In the present case the hopper 86 is adapted to supply the material which is undergoing treatment, while the hopper 87 supplies the material which generates the hot gases. The interior of the inclosure 88 is separated to some extent into two compartments 89 and 90 by means of a plurality of downwardly depending bars or rods 91$^a$. These bars simply serve to prevent the different classes of material from becoming mixed together, but they do not interfere with a free passage of the gases.

In the lower portion of the compartment 90 there is mounted a grate or the like 91 which preferably slants toward another grate 92 mounted in a side wall, substantially as indicated. A plurality of ash bars 93 carried by the longitudinally extending rod 94 serve to collect the ash as the same finds its way down over the grate 91, so that the ash may be dropped into the pit 95 from time to time by rocking the shaft 94. A door 96 leading into the ash pit gives ready access to the same for the removal of the ash.

A longitudinally extending air flue 97 serves to deliver air through flues or the like 98 located at the ends of the oven to a space 99 in the wall or partition 100. From this space the air is directed down into the space 101 behind the grate 91, or through flues 102 located at the ends of the oven into the space 103 behind the grate 92. It thus follows that all of the air admitted to the material undergoing combustion is passed through the hollow wall 100 and is therefore subjected to the heat of such wall. Valves 104 may be provided for controlling the admission of air from the flue 97.

The lower portion of the compartment or space 89 communicates by means of a port 105 with the gas flue 106. This flue in turn may communicate with a gas purifying means, or suction device, according to the uses to which the gas is to be placed. Ports 107 located in the upper portion of the compartment 89 serve to carry off the richer hydrocarbons, if desired, in the manner previously described.

In the lower portion of the compartment 89 there is slidably mounted an angular block of concrete or the like 108 which may be projected out into the position illustrated in Fig. 8, or may be withdrawn into the socket 109 by means of a handle or the like 110. When the block is withdrawn into the socket the lower portion of the compartment 89 is unobstructed by the block, and the material may pass down freely to the picks or other removing or cutting devices. On the other hand when the block stands in its projected position as illustrated, it will interfere with the free movement of the material at the left hand side of the oven so that a portion of material will be supported by the block for a long period of time and will not descend with the remainder of the material. At such times this portion of material will attain and retain the maximum temperature existing in the compartment 89, and the gas passing into the flue 106 will be forced to traverse or pass through this body of hot material. At such times, therefore, this body of material will perform the function heretofore described as being performed by the material contained in the compartment 12 of the arrangement shown in Fig. 1 when the valve member 48 stands in the position illustrated in such figure. That is, the material sustained by the member 108 will serve the function of "fixing" the gas passing through it to the flue.

In order to better control the movement of the body of material when the member 108 stands in the position illustrated, I have provided a deflector or flaring portion 111 in the side wall of the compartment 89. This deflector will tend to guide the main body of material in its movement so that the portion which is sustained by the block 108 will not be thrown or dragged from said block but will maintain its position thereon.

In the arrangement shown in Fig. 8 I have illustrated a coke removing device of different construction from that shown in Fig. 1. In the present case a plurality of picks or the like 112, each having its outer end beveled to provide a cutting edge 113, are adapted to travel back and forth across the lower portion of the material descending through the compartment 89. These picks may be conveniently supported or carried by a cross bar or the like 114. An extension 115 is connected to a lever 116 so that by operating said lever the picks will be worked back and forth. When the picks stand in the projected position shown in Fig. 8 they will of themselves support the material contained in the compartment. In order to support the material when the picks are withdrawn, and at the same time to allow the material to descend a certain distance, I have provided a platform or the like 117 which is adapted to travel back and forth simultaneously with the picks. This platform has its front edge 118 substantially in line with the cutting edge 113 of the picks, so that as rapidly as the picks are withdrawn the platform will follow to support the material which descends in the compartment. In order to cause a simultaneous movement of the picks and platform the end portions of the platform may be connected to the cross bar 114 by means of end bars 119.

With the pick arrangement just described each time the picks and platform are drawn to the left substantially the entire body of material contained in the compartment 89 will be allowed to descend and be supported by the platform. If the movement be then reversed the picks will shear off a thickness of material substantially equal to the distance between the upper surface of the platform and the edges of the picks. As the picks perform this shearing function they serve to sustain the material even though the platform be retreating. Obviously, any suitable mechanism may be provided for periodically moving the picks and platform back and forth. In order to cool the material as it descends after being cut off a water pocket or the like 120 may be provided beneath the compartment 89, said water pocket serving also as a water seal to the compartment.

It will be seen from the foregoing that the fundamental features underlying the operation of the arrangement shown in Fig. 8 are the same as those underlying the previously described arrangement. The hot gases are generated in the compartment 90 by combustion of one portion of material on the grates 91 and 92, thereby completely consuming the oxygen which enters, and then the hot gases thus generated and without excess of oxygen pass through the entire mass or body of material in the compartment 89 to perform the distilling function therein without oxidation or combustion. Therefore at such time the arrangement shown in Fig. 8 operates on identically the same fundamental principles as that of Fig. 1. Inasmuch as the fundamental or underlying feature or principle is the passage of hot gases generated by the combustion of one portion of material and without the presence of free oxygen through the body of another portion of material so that such other body is simply subjected to the distilling action of hot gases without oxidation, it follows that many other arrangements might be adopted for generating the hot gases in the first place. For example, in some instances it might be desired to burn gas instead of coal or other solid fuel for the generation of the hot gases, and therefore in Fig. 9 I have shown a modified form of grate adapted to be used in connection with the other features of Fig. 8. In the arrangement shown in Fig. 9 fuel gas from any desired source is delivered from a main 121 through the openings 122 and directs its flame up through a space 123 and over and into the compartment 89 at the side thereof. The air in this case is delivered through the openings 124 and 125 to both sides of the flame so as to equalize the combustion. In carrying on the operation with the gas in this manner it is evident that the admission of air may be controlled in such manner that the gas will burn to carbon monoxid instead of carbon dioxid, so that when it has passed through the body of material in compartment 89 and mingled with the gas liberated in the same the entire volume or body of gas passing into the flue will be of a combustible composition. It therefore follows that the modification shown in Fig. 9 is capable of producing substantially the same results in substantially the same way as the other arrangements illustrated.

I wish to call particular attention to the fact that in carrying on a distilling process according to the methods herein disclosed the entire sensible heat liberated during the formation of the gases evolved by combustion is available for useful work as this sensible heat is the heat which serves to perform the distilling function of the main body of carbonaceous material. For example, if the coal or gas which is being burned in the compartment 10 of the arrangement shown in Fig. 1, or the compartment 90 of the arrangement shown in Fig. 8, is burning to carbon monoxid it is generating a certain number of heat units per unit of mass, but nevertheless the gas generated, being carbon monoxid is in itself combustible. Ordinarily in the production of producer gas the sensible heat of the carbon monoxid is lost inasmuch as the gases are cooled before they can be transported or stored. In the present case, however, I make use of this sensible heat for the distillation of the main body of carbonaceous material which is undergoing the coking operation thereby saving the sensible heat and causing it to perform useful work. Furthermore by allowing the burning material to burn only to carbon monoxid, a sufficient quantity of sensible heat is liberated to raise the temperature of the monoxid to a sufficient degree to fully coke the material if desired, and then, when the carbon monoxid mingles with the hydrocarbon thus liberated, the mixture will not be diluted, or have its heating value impaired, by the presence of carbon dioxid. In other words, I may make uses of a combustible gas, self-heated in its formation, for carrying on the distilling action of the carbonaceous material.

- Under some conditions it may be desired to enrich the gases delivered from the oven, or to increase the proportion of richer hy drocarbons. This can be conveniently done by the injection of oils, tars, or the like into or onto the carbonaceous material as the same is first delivered into the chamber 16 of Fig. 1, or the upper portion of the chamber 89 of Fig. 8. These oils or tars will then distil as their temperature rises, and the rich gases thus given off will mingle with those delivered into the ports 37 and 38 in the upper portion of the structure. In this way the enriching oils will be distilled without the necessity of suddenly injecting them into an extremely hot mass of materials as is the custom at the present time.

I have previously explained that as the material descending through the distillation chambers (11 and 12 of the arrangement shown in Figs. 1 to 7 inclusive, and 89 of the arrangement shown in Figs. 8 and 9), is removed by the picks or other mechanism it may be allowed to descend into the water baths or seals. This material will contain considerable heat as it enters the water, and consequently a certain amount of steam will be evolved. This steam, or steam introduced in any other manner desired, may be allowed to ascend through the mass of coking material in the chambers 11, 12 or 89, and, when allowed to pass through this coking material will serve to generate a certain amount of water gas directly in these distillation compartments. It will be seen that when the above action is allowed to take place the gas entering the flue 42 or the flue 106 will contain water gas generated in the distillation compartments. Under these circumstances it will be possible to generate a combination gas including water gas, even though the gas generated in the compartment 10 of the arrangements shown in Figs. 1 to 7 inclusive, or the compartment 90 of the arrangement shown in Fig. 8 be pure producer gas.

I have previously explained how by manipulation of the valves 51 and 48 the action going on in the distillation compartment 12 can be controlled in various manners. The generation of water gas is an endothermic action—that is one in which heat is absorbed during the generation of the gases. It therefore follows that the heat necessary for the generation of the water gas must be supplied either continuously or intermittently. If the current of hot gases coming over from the compartment 10 through the compartments 11 and 12 be continuous this current of hot gas will continuously supply the necessary heat for the generation of water gas in the compartments 11 and 12. If on the other hand the current of gas from the compartment 10 flowing through either the compartment 11 or the compartment 12 be intermittent the generation of water gas in these compartments 11 and 12 will be intermittent. In case the valve 51 be left open for a certain length of time so that hot gases will flow through the compartment 12 to heat the material therein, then such valve can be subsequently closed and the generation of water gas in the compartment 12 may be allowed to proceed for an interval and until the materials contained in the compartment 12 have cooled to the lowest desirable limit. Thereupon the valve 51 may be reversed, again allowing hot producer gas to flow through the compartment 12 to again heat the material contained therein, whereupon this valve may be again closed, and the generation of water gas in compartment 12 may be resumed. Thus an intermittent generation of water gas may be obtained, if desired. Manifestly, mechanism might be provided for controlling the flow of producer gas through the compartment 11 for purposes similar to the flow of producer gas through the compartment 12.

I desire to summarize certain of the actions which may be obtained with the means herein disclosed as follows:

Ordinary producer gas of from 140 to 160 B. T. U. capacity may be generated from the compartment 10.

Carbureted producer gas of from 175 to 300 B. T. U. capacity may be generated by passing the producer gas through the compartments 11 and 12.

Combination water and producer gas of from 175 to 300 B. T. U. capacity may be generated by allowing steam to rise up through the distillation chambers 11 and 12, in which case the entire solid contents of said chambers may be consumed, or by introducing steam through the chamber 10.

Combination water, producer, and oil and coal gas of from 200 to 500 B. T. U. capacity may be generated by introducing oils or tars onto the mass descending in the chamber 16, in which case either partially or fully coked coal may be obtained by the picks.

Illuminating coal gas of from 600 to 800 B. T. U. capacity may be obtained from the flues 37 and 38 at the same time that producer gas of approximately 150 B. T. U. capacity is obtained through the flue 42.

In addition to the foregoing, various combination gases may be obtained by mixing the foregoing constituents in the desired proportions as has been previously explained.

Manifestly, many other constructions and arrangements might be adopted for carrying into effect the processes of the present invention, and therefore I do not limit myself to the arrangements illustrated, except as may be called for in the claims.

I claim:

1. In an apparatus of the class described, the combination with an inclosed chamber, of a pair of partitions upwardly extending within the body of the same to divide the lower portion of said chamber into three compartments, said partitions terminating at a lower elevation than the roof of the chamber, means for supplying carbonaceous material into the upper portion of the chamber and above the upper edges of said partitions, to thereby supply the material to all of the compartments, there being openings in the upper portion of each partition establishing communication between the central compartment and the side compartments through the partitions, and there being delivery openings in the walls of the side compartments at points of lower elevation than the openings in the partitions, coke removing means in the lower portion of each of the side compartments for permitting continuous removal of coked material without the admission of air or escape of gas, and a suitable grate in the central compartment at lower elevation than the openings in the partition, whereby material entering the central compartment may be separately burned on said grate to generate hot producer gas, which producer gas subsequently passes through the material contained in the side compartments to distil said material and pass off through the discharge openings.

2. In a device of the class described, the combination with an inclosed chamber, of a pair of partitions upstanding in the central portion of the same and terminating at a point of lesser elevation than the roof of the chamber, to thereby divide the lower portion of the chamber into three compartments, there being openings in each of said partitions near the upper edges thereof, there being delivery openings in the wall of the side compartments at lower elevations than the openings in the partitions, means for delivering carbonaceous material into the upper portion of the chamber and into all three of the compartments, means permitting continuous removal of coked material from the lower portion of each of the side compartments without the admission of air or the escape of gas, and means for consuming carbonaceous material descending into the central compartment to thereby generate hot producer gas in said compartment, which producer gas thereafter flows in current through the openings in the partitions and through the carbonaceous material contained in the side compartments to thereby distil said material and pass off with the distillate gas through the discharge openings.

3. In a device of the class described, the combination with an inclosed chamber, of partitions upwardly extending in the lower portion of said chamber and terminating at lower elevations than the roof thereof, to thereby divide the lower portion of the chamber into three compartments, there being openings in the upper portions of said partitions, dampers controlling the flow of gas through said openings, there being discharge openings in the walls of the side compartments at lower elevations than the openings in the partitions, means for introducing carbonaceous material into the upper portion of the chamber and into all of the compartments, means for consuming at a desired rate the carbonaceous material entering the middle compartment, and means for continuously removing coke from the lower portion of each of the side compartments without the admission of air or the escape of gas.

4. In a device of the class described, the combination with an inclosed chamber, of partitions upwardly extending in the lower portion of the same to divide said lower portion into three compartments, said partitions terminating at a lower elevation than the roof of the chamber, there being openings in the upper portions of said partitions, means for controlling the flow of gas through said openings, there being delivery openings in the wall of the side compartments at lower elevations than the openings in the partitions, means for consuming carbonaceous material descending through the central compartment to thereby generate producer gas, and means for continuously removing coke from the lower portion of each of the side compartments at a desired rate without the admission of air or the escape of gas.

5. In a device of the class described, the combination with an inclosed chamber, of a pair of partitions upwardly extending into the same to divide the lower portion of the chamber into three compartments, said partitions terminating at a lower elevation than the roof of the chamber, there being openings in the upper portions of said partitions, means for delivering carbonaceous material into each of said compartments, there being gas delivery openings in the side compartments at lower elevations than the openings in the partitions, means for consuming carbonaceous material in the central compartment to thereby generate the producer gas, and means for continuously removing coke from the lower portion of each of the side compartments without the admission of air or the escape of gas.

6. In a device of the class described, the combination with an inclosed chamber, of partitions upwardly extending into the lower portion of said chamber to divide said lower portion into three compartments, there being openings in the upper portions of the partitions, means for delivering carbonaceous material into each of said compartments, there being gas delivery openings in the walls of said compartments, means for effecting a desired rate of combustion of carbonaceous material contained in the central compartment, and means for continuously removing coke from the lower portion of each of the side compartments at a desired rate without the admission of air or the escape of gas.

7. In a device of the class described, the combination with an inclosed chamber, of a combustion compartment and a distillation compartment in the lower portion of the same, means for supplying carbonaceous material to each of said compartments, there being an opening establishing communication between said compartments, means for controlling the flow of gas through said opening, there being a gas delivery opening in the wall of the distillation compartment at a lower elevation than the first mentioned opening, means for effecting a desired rate of combustion in the combustion compartment, and means for continuously removing coke at a desired rate from the distillation compartment without escape of gas or entrance of air into the distillation section.

8. In a device of the class described, the combination with an inclosed chamber, of a combustion compartment and a distillation compartment within the same, there being an opening giving communication between the upper portions of said compartments, means for supplying carbonaceous material to both of said compartments, there being a gas delivery opening in the wall of the distillation compartment, means for effecting combustion of carbonaceous material at a desired rate in the combustion compartment, and means for continuously removing coke from the lower portion of the distillation compartment without the admission of air or the escape of gas.

9. In a device of the class described, the combination of a combustion compartment and a distillation compartment, means for supplying carbonaceous material to each of said compartments, there being an opening for the delivery of gas from the combustion compartment to a distillation compartment, means for controlling the flow of gas through said opening, there being a gas delivery opening in the wall of the distillation compartment, means for effecting a desired rate of combustion in the combustion compartment, and means for continuously removing coke from the distillation compartment without the admission of air or the escape of gas.

10. In a device of the class described, the combination of a combustion compartment and a distillation compartment, means for supplying an independent moving mass of carbonaceous material to each of said compartments, there being an opening for the delivery of producer gas from the combustion compartment to the distillation compartment, and there being a gas delivery opening in the wall of the distillation compartment, means for burning the carbonaceous material supplied to the combustion compartment, and means for continuously removing coke from the distillation compartment without the escape of gas or admission of air.

11. In a device of the class described, the combination with a distillation compartment, of means for supplying a moving mass of carbonaceous material through the same, there being a producer gas supply opening in one side of said compartment and a distillate gas delivery opening in the other side of said compartment, and means for continuously removing coke from the delivery end of the compartment without the admission of air into the compartment or the escape of gas therefrom.

FRANCIS PRIBYL.

Witnesses:
THOMAS A. BANNING, Jr.,
FRANCES M. FROST.